United States Patent [19]

Walton, Jr. et al.

[11] Patent Number: 5,621,723
[45] Date of Patent: Apr. 15, 1997

[54] POWER CONTROL IN A CDMA NETWORK

[75] Inventors: Jay R. Walton, Jr., Westford; John W. Ketchum, Watertown, both of Mass.

[73] Assignee: GTE Laboratories Incorporated, Waltham, Mass.

[21] Appl. No.: 463,411

[22] Filed: Jun. 5, 1995

Related U.S. Application Data

[62] Division of Ser. No. 312,851, Sep. 27, 1994.

[51] Int. Cl.$^6$ .................................................... H04J 13/00
[52] U.S. Cl. .............................. 370/18; 370/60; 375/200; 455/33.1
[58] Field of Search .................................... 370/18, 60, 20; 375/200, 1, 205; 455/33.2, 33.1, 38.3; 364/942.08; 327/238, 254, 260; 360/29

[56] References Cited

U.S. PATENT DOCUMENTS 5,103,459  4/1992  Gilhousen et al. ........................ 370/18
5,327,455  7/1994  De Gaudenzi et al. .................. 370/20
5,383,219  1/1995  Wheatley, III et al. ..................... 375/1
5,465,269  11/1995  Schaffner et al. ........................ 370/18

Primary Examiner—Wellington Chin
Assistant Examiner—Melissa Kay Carman
Attorney, Agent, or Firm—Leonard Charles Suchyta

[57] ABSTRACT

A means of power control on the reverse link of a CDMA network is disclosed. Specifically, the forward link from the base station to the subscriber unit is used to direct the subscriber unit to modify the output power radiated. The forward link consists of the forward packet data channel and the forward channel control channel. The forward packet data channel carriers the informational data to the subscriber unit, and the forward packet control channel includes carries of a power control setting. The forward channel is bi-phase modulated with the forward packet data channel transmitted in-phase and the forward packet control channel transmitted in quadrature.

1 Claim, 2 Drawing Sheets

POWER CONTROL IN A CDMA NETWORK

This is a divisional of copending application Ser. No. 08/312,851 filed on Sep. 27, 1994.

BACKGROUND OF THE INVENTION

The present invention relates to CDMA-based radio networks and, more particularly, to packet-switched data services.

IS-95 based CDMA currently has very limited packet-switched data capabilities as disclosed in TIA/EIA/IS-95 Interim Standard, Mobile Station-Base Station compatibility Standard for Dual Mode Wideband Spread Spectrum Cellular Systems, July, 1993 (herein incorporated by reference). The primary limitation is imposed by the reverse link. On the forward link, the paging channel can be used to accommodate outbound traffic, although the maximum data rate imposed is currently restricted to 9600 bps. On the reverse link, two mechanisms exist which can be used to facilitate in-bound traffic. Short messages (i.e. 110 bytes or less) can be accommodated by using the access channel. The peak data rate supported on the access channel is 4800 bps. The random access protocol employed is highly inefficient, yielding data throughputs significantly less than 4800 bps. For longer messages, negotiation of a dedicated traffic channel is required. While the traffic channel is capable of supporting 9600 bps sustained, the set-up times can be prohibitively long for short messages (e.g. 800 msec).

The existing IS-95 channel structure associates a group of reverse access channels with a single forward paging channel. The paging channel is used to carry system configuration information as well as user data. Up to 7 paging channels can be supported currently, each delineated with a sector by a separate Walsh code. Different sectors within the network are delineated by covering all channels in the sector with a complex valued pilot code. The modulation employed on the paging channel is essentially BPSK, using data rates of either 4800 bps or 9600 bps. Currently, there are 64 Walsh codes for channelization on the forward link; however, each Walsh code may be reused to facilitate greater capacity and/or data rates. The paging channel is currently segmented into fixed 80 msec slots.

Associated with each paging channel are 32 reverse link access channels. Access channels are chosen at random by users and are delineated by non-orthogonal codes. The codes within a sector are a function of the sector pilot code, paging channel code and the access channel chosen. The random access protocol employed is based on slotted ALOHA, with the slot size being a system configurable parameter. The parameters governing the protocol permit additional randomization of packets through time offsets to further reduce the possibility of collisions. All packets employ a minimum of 20 msec of un-modulation preamble to allow for acquisition by the base station. The access channel data rate is fixed at 4800 bps, with 64-ary orthogonal modulation being employed.

Mobiles use the access channel to request access to the network respond to page channel messages and send short messages to the base station. The procedures governing it's use are identical, regardless of the transaction classification. Several key factors that limit the efficiency of the access channel for packet data are outlined briefly below:

1. Initial Transmit Power

The initial transmit power employed by a mobile is determined using a simple rule which requires the sum of the received power and transmitted power to the constant. This open loop estimate can be error by as much as 8 dB due to inaccuracies introduced by both the estimation process and mobile implementation. The errors serve to reduce system capacity as well as reduce data throughput.

2. Fixed Transmit Power

The emitted power remains constant for the duration of a packet. However, the channel conditions and interference levels change over the duration of a packet. Since the transmit power remains constant, there are times when the received power is more than adequate and other times when it is less than adequate. This reduces system efficiency.

3. Access Channel Acquisition

The cell site receivers are designed to continuously search for access channel messages. The processing requirements imposed by the access channel structure can be large, particularly when the number of searcher elements becomes limited (i.e. serving cells). When the hypothesis space a single searcher must examine becomes large, the duration of the packet preamble may be extended to avoid missed acquisitions due to limited processing power. This increases the overhead-to-data ratio per packet.

4. Fixed Access Channel Data Rate

The access channel data rate operates at a fixed rate of 4800 bps. In addition, the access channel packet sizes are of fixed duration. Under certain circumstances the network is capable of supporting higher data rate transactions. Support of higher data rates increases overall throughput of the system. There are other circumstances where mobiles may be peak power limited and cannot support reliable communications at 4800 bps. In these cases it is desirable to provide a more reliable lower data rate service alternative.

5. Limited Feedback Channel Information

While using the access channel, mobiles are required to monitor the corresponding paging channel for system status messages as well as messages addressed to specific mobiles. There are not explicit feedback mechanisms employed at the physical layer such as power control, channel busy/idle status and system load. The lack of timely feedback information severely limits the throughput and capacity of a packet data service.

6. Soft Handoff

There is currently no mechanism to support soft handoff while using the paging or access channels. Traffic channel operation is currently the only channel type for which soft handoff is supported. This may limit the coverage, capacity and throughput capabilities of a packet service.

SUMMARY OF THE INVENTION

In accordance with the invention, a method if a packet-switched CDMA network for communicating between a base site and a mobile site comprises the steps of: transmitting signaling traffic from the mobile site to the base site; acquiring the transmitted signalling traffic at the base site and responsively communicating power control data to the mobile site; and receiving and interpreting said power control data at the mobile site and adjusting the transmission of said signaling traffic in accordance with said interpreted power control data.

DETAILED DESCRIPTION OF THE PREFERRED EMBODIMENTS

Figure 1:
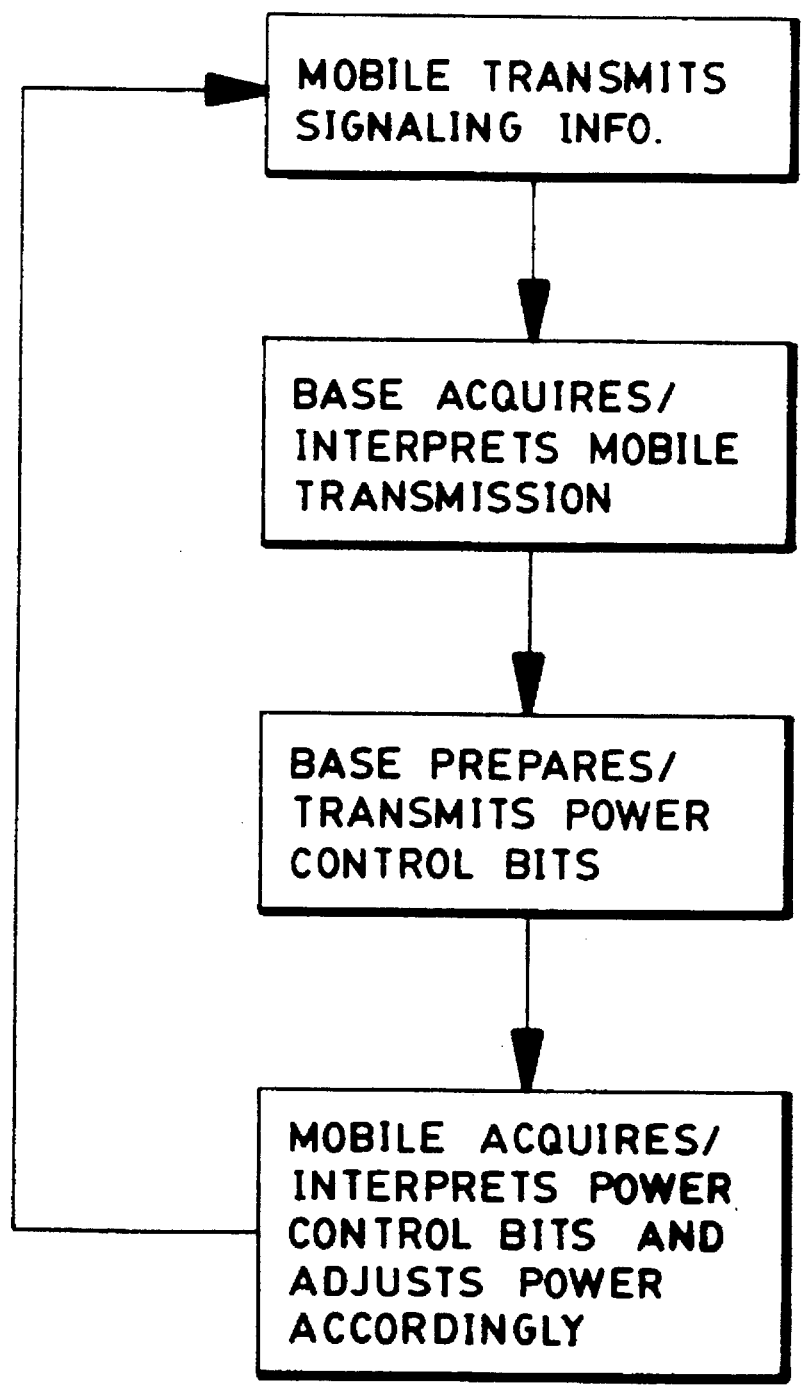
FIG. 1 shows a flowchart demonstrating one aspect of the present invention.

In order to provide for an efficient packet service, changes to the existing standard are required. Several new channel types are defined herein to distinguish from existing channels such as the paging and access channels; a forward and reverse packet data channel, forward packet data control channel and associated forward power control and channel status subchannels. The composition and structure of these channels is functionally described in the following sections.

Reverse Packet Data Channels

A reverse packet data channel is associated with a single receiving element at the cell site. This receiver element is shared by a given set of mobiles within the cell all having a common attribute: reverse link data rate. Several such receivers may exist within a cell, each serving a potentially different group of users. The reverse link data rate determination is made by the mobile based on it's power class and estimated transmit power margin. For example, a mobile may determine based on the open loop power estimate that a 20 dB transmit power margin exists over what is required to operate reliably at the lowest data rate supported. In this case, the mobile may select the reverse packet data channel corresponding to the maximum data rate which the link can support.

The reverse packet data channels are delineated by assigning a given code or set of codes to correspond to a fixed data rate. Mobiles that select a specific data rate are required to use a code from the set which is assigned to that channel. For example, suppose that 8 different data rates are supported in the packet data network. A packet data channel code set is assigned to each of the 8 channels and a corresponding receiver element is assigned to serve a specific channel or channel set. When only one code is assigned to support a given data rate channel, the possibility of two or more users attempting to simultaneously use the reverse packet data channel exists. When multiple codes are assigned, this likelihood is reduced at the expense of increased processing requirements. The number of data rates supported is a system configurable parameter as are the actual data rates.

Contention resolution on the reverse link packet data channel is handled in a number of ways. At the physical layer, the channel status feedback is used to indicate acquisition success/failure. In the event of a collision, the random access protocol used at the physical layer invokes a randomized backoff and retry algorithm. When multiple codes are used per reverse packet data channel, the radio link protocol (RLP) employed can be used to indicate the acquired code channel in a forward packet data channel message.

Slotting is used on the reverse link packet data channels with configurable slot durations permitted. The minimum permitted slot duration will be a function of the data rate on the forward packet data channel. In order to distribute system load and receiver processing more evenly, staggered slotting may be implemented. In this case, reverse packet data channels corrresponding to different data rates are assigned distinct slot time offsets relative to system time. In this manner, packets from the various data rate groups do not arrive at the cell simultaneously, thereby increasing the cell load instantly. In addition, the staggering of slot times allows a single receiver element to support multiple data rate channels is desired. The slot timing offset employed and slot duration are system configurable parameters.

Continuous transmission is employed over the duration of a packet as described in R. Walton, "Use of Repeat Coding for PCS CDMA Reverse Link Traffic Channel Operation", JTC(AIR)/94.04.28–297, March 1994, herein incorporated by reference. Data rate may be changed during the packet only if commanded by the base station. Variable packet durations are supported and are expressed in units of frames (i.e. multiples of 20 msec intervals). Interleaving and coding shall follow the recommendations set forth in R. Walton, "Proposed Repeat Coding Mode Functionality for PCS CDMA Reverse Link Traffic Channel Operation", JTC(AIR)/94.06.13–415, June 1994, herein incorporated by reference. Extension to rates in excess of 14.4 kbps is possible using the extended CDMA PCS system modulation parameters for the reverse traffic channel defined in Qualcomm, Inc. and Motorola, Inc. "The CDMA PCS System Common Air Interface Proposal". JTC(AIR)/93.11.01–404, Nov. 1, 1993, and Qualcomm, Inc. "Proposed CDMA PCS Standard", JTC(AIR)/94.01.19–22R1, Apr. 28, 1994, both herein incorporated by reference. The maximum packet duration shall be a system configuration parameter. This duration may be related to the window size employed in the RLP that is used to perform the ARQ functions.

By using dedicated channel codes assigned to specific data rates, the reverse packet data channel receivers to not have to estimate the channel data rate. This greatly simplifies the processing requirements of the receiver. Since the cell site knows both the slot timing and data rate of arriving packets on a given reverse packet data channel, the number of hypotheses that require examination in a given interval can be made to match the processing capabilities of the cell site hardware. In addition, the imposed channel structure facilitates rapid detection of packets and enables closed loop power control to be established quickly. Since the detection threshold is fixed for a given data rate, the closed loop power control can be enabled as soon as the detection threshold is exceeded. This allows short preambles to be employed, thereby increasing the reverse packet data channel efficiency. Further, the status of the acquisition can be conveyed to the mobile quickly, allowing mobiles to exit the channel rapidly if acquisition fails.

Forward Packet Data Channels

On the forward link, forward packet data channels are used to carry outbound traffic. Associated with each forward packet data channel are one or more reverse packet data channels. In general, the forward packet data channel operates at a fixed data rate, although this is not necessarily a restriction. (It is possible to employ multiple data rates on a single forward packet data channel. In this case, it is necessary to establish a subchannel to carry system information at a known data rate. The slot timing of this subchannel is fixed to allow mobiles receiving at other rates to change rates at the appropriate time to listen for system messages. Power allocation can be applied judiciously to packets based on transmitted data rate. The RLP employed will likely be ACK/NAK-based in this case, since it is difficult for the mobile to discriminate valid message decode failures.) The basic concept here is to provide for the possibility of multiple reverse packet data channels per forward packet data channel with the added flexibility that the reverse packet data channels may serve different user groups having distinct data rate requirements.

In the radio environment, extended range is afforded at the expense of decreased data rate. The use of multiple forward packet data channels allows the network coverage to be segmented into regions having different data rate capabilities. Mobiles may determine the data rate sets that are supported on the reverse link from the system parameters messages sent over the forward packet data channel to which they are tuned. Unreliable reception of the forward packet data channel is an indication to the mobile to tune to a lower data rate forward packet data channel, if supported. Mobiles that are receiving at a specific data rate are required to convey this information at registration, or whenever they change to another forward packet data channel. The base station may also query mobiles to determine the receive data rate capability at the time of a transaction.

As an example, support two forward packet data channels are supported in the network. The high data rate channel operates at 38.4 kbps and the low data rate channel operates at a rate of 9600 bps. Associated with the high data rate forward packet data channel are 4 reverse packet data channels with rates ranging from 14.4 kbps to 38.4 kbps. Similarly, the low data rate forward packet data channel may have associated with it an additional 4 reverse packet data channels with rates ranging from 1200 bps to 9600 bps. Note that the reverse packet data channel rate sets assigned to each forward packet data channels may overlap. Also, it is possible to associate several reverse packet data channels of the same rate with a single forward packet data channel.

Information carried on the forward packet data channel consists of global system parameters messages and data addressed to specific mobiles. This may include user data as well as status/control information generated by the RLP and handoff management functions. Coding and interleaving follow that proposed in the TIA/EIA/IS-95 Interim Standard, and Qualcomm, Inc. and Motorola, Inc., supra, for traffic channel operation.

One of the key design problems is to determine the channel structure which best suits the forward and reverse link packet data requirements imposed by the applications supported ion the network. A significant number of data applications have asymmetric traffic requirements. The ability of the packet data service to exploit this is critical in maximizing capacity. Since the reverse packet data traffic channel will typically exhibit lower throughput than the forward packet data channel, the ability to associate more than one reverse packet data channel with a forward packet data channel allows the forward and reverse throughputs to be better balanced. Further, the ability to temporarily shut off reverse packet data channels is enabled using the channel status indicators. This allows the cell to dynamically adjust the reverse link traffic load to better match the forward link load, if so desired. (Several strategies exist in this case. For example, if a specific application requires significant simultaneous forward and reverse link capacity, reverse packet data channels can be shut down to avoid the additional congestion on the forward link imposed by other reverse link users. Alternatively, the reverse channels could be kept open. Optimization may involve some combination of the strategies).

Forward Packet Data Control Channel

In conjunction with the forward packet data channel, a forward packet data control channel is also used. Mobiles are required to monitor both the forward packet data channel and the forward packet data control channel simultaneously.

The forward packet data control channel is used to convey timely information to mobiles. This information consists of, as a minimum, reverse packet data channel status (i.e. busy/idle) and closed loop power control bits for all mobiles actively transmitting on the associated set of reverse packet data channels.

Several potential implementations that facilitate the forward packet data control channel exist. The simplest implementation is to use the same scheme that is currently used on a forward traffic channel. That is, the forward packet data channel may be punctured with the power control information for a single transmitting mobile. The problem with this approach is that only one or two reverse packet data channels can be supported by the forward packet data channel without significantly compromising performance. Given the asymmetric traffic demands placed on the network by packet data services, it is desirable to use a scheme which permits multiple reverse packet data channels to be supported simultaneously by a single forward packet data control channel.

Figure 2:
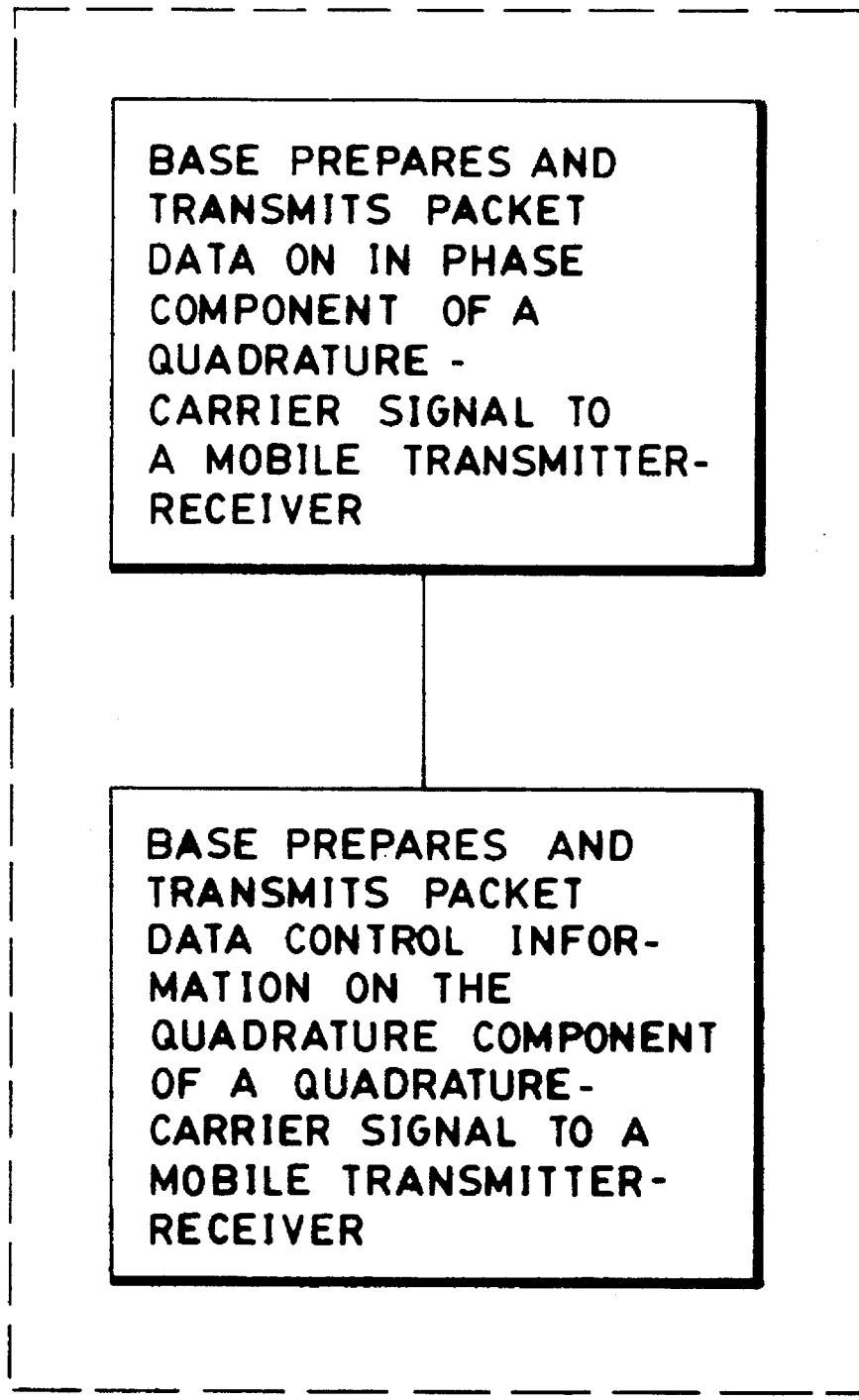
FIG. 2 is a detailed block diagram of the third from the top block of FIG. 1.

Referring to FIG. 2 of the drawings, one way this can be done is to utilize the quadrature channel of the forward packet data channel. That is, the in-phase component would carry the forward packet data and the quadrature channel would carry the forward packet data control information. The combination of the forward packet data and forward packet data control channels would share a common Walsh code channel and be modulated using QPSK. Note that both the power control and channel status data are transmitted uncoded. In addition, the transmit power allocated to the combined channel will need to take this into consideration since the error rate on the control channel will be greater than that experienced on the data channel.

Another potential implementation is to use a separate Walsh code channel specifically for carrying the control traffic associated with a forward packet data traffic channel. Here, one of the effective code channels is employed to carry forward packet data traffic while the other is used to carry power control and status information. In the case of higher data rate forward packet data channels such as 38.4 kbps, it is possible to extend the overlay coding technique to accommodate the control subchannel. Other hybrid schemes exist based on the combination of these techniques.

Power Control Subchannels

The power control subchannel employed in IS-95 to control reverse link traffic channels operates at an 800 Hz rate. Frames are divided up into 16 intervals of 1.25 msec in duration called power control groups (PCG). The base station forms an estimate of the received power by averaging over this interval and compares the estimate to a fixed threshold. Power control bits are generated as a result of this comparison and inserted into the forward traffic channel in a pseudo-random manner. The loop delay in the process is two PCG's or 2.5 msec. Step sizes used are fixed at 1 dB.

What is proposed herein is to use the power control subchannels on the forward packet data control channel. The same step size and power control rate can be used, namely 1 dB and 800 bps, respectively. The distribution of the power control bits into the power control subchannel is accomplished in a different manner. The maximum number of power control subchannels supported by a forward packet data control channel will depend upon the data rate of the forward packet data channel. For example, at 9600 bps no more than 12 subchannels operating at 800 bps each can be supported. Some of this capacity must be reserved for the channel status information associated with each subchannel. At 38.4 kbps, 48 subchannels are possible operating at 800 bps. In this case, it may be desirable to introduce additional redundancy or increase the frequency of control data.

As an illustration, assume that the forward packet data channel is operating at 9600 bps. Further assume that 6 forward power control subchannels are supported and the remaining capacity is used to convey reverse packet data channel status. Dividing the 20 msec frame into 16 PCG slots gives a total of 12 control bits/PCG slot. Each of the 6 power control subchannels is then assigned one of the available bits within the PCG slot. The assignment is fixed and known to all mobiles monitoring the forward packet data/control channels. Mobiles not transmitting simply ignore the power control subchannels. When a mobile is transmitting, the power control subchannel assigned is used to drive the mobile transmit power. FIG. 1 illustrates the procedure when such a forward packet data control channel is operational.

Channel Status Subchannels

The channel status subchannel is used to indicate the status of a specific receiver element. A one-to-one correspondence between the channel status subchannel and receiver element is employed, similar to that used for closed loop power control The channel status subchannel conveys the busy/idle status of a receiver element dedicated to serving one or more reverse packet data channels. It is also used to indicate when the reverse link packet data channel has been successfully acquired.

A tradeoff exists with respect to the reporting frequency of the channel status data (i.e. the slot interval) and the number of simultaneous reverse link packet data channels supported. That is, if a single forward packet data channel is employed and is designed to support N reverse packet data channels, and if reverse packet data traffic is uniformly distributed over the N channels with a combined arrival rate of r, the arrival rate on each of the channels is then r/N. Thus, for fixed probability of collision, the slot interval used on each reverse packet data channel can be made proportional to the number of channels supported. Note that the slot interval used is not necessarily the same interval that is used for closed loop power control (i.e. a PCG slot of 1.25 msec.)

Another tradeoff exists with respect to the slot interval and the maximum reverse link packet data rate supported. When high data rates are supported on the reverse packet data channel, it is desirable to use smaller slot intervals on the forward link in order to increase the efficiency. That is, greater capacity loss and increased vulnerability are associated with linger slot intervals. Therefore, it is desirable to associate with the forward packet data channel those reverse packet data channels operating at rates equivalent to or less than that of the forward channel. In this way, the slot intervals can be designed to maximize the reverse packet data channel efficiency.

Since the access attempts of all mobiles using a specific reverse packet data channel are dictated by the channel status information, it may be desirable to improve the reliability of this data by introducing some form of redundancy. In CDPD for example, the busy/idle flags are simply repeat coded 5 times, yielding an increase in Eb/No for this subchannel. In a fading environment, it may be desirable to achieve some diversity by distributing the redundancy over time. The problem is increasing the interval over which the redundancy is spread increases the slot interval. Since the probability of a collision increases with increased slot interval, the degree of robustness for the channel status subchannel must be traded off against the slot interval.

As an example, assume the forward packet data control channel data rate is 9600 bps. Let 6 forward packet data power control channels be employed along with 6 status channels. Suppose the error probability is 5% on the uncoded control channel. If a slot interval of 1 PCG is chosen, the probability of incorrect decode (i.e. declaring idle when busy, or vice versa) is 5%. This may be unacceptable, particularly at high traffic levels. Extending the slot interval to 4 PCGs by repeating the busy/idle status bit once per PCG yields an additional margin in Eb/No (e.g. 1.4% decode error probability with majority decoding).

Reverse Packet Data Channel Acquisition

The preamble length used by the mobile should be designed to give a reasonable probability of detection and false alarm given that the initial transmit power is adequate to support communications. For equivalent acquisition performance over the various data rates supported, the energy conveyed by the preamble must be adjusted accordingly. This can be accomplished by scaling the preamble duration, adjusting transmit power applied to the preamble, or some combination of these methods.

In general, excellent detection and false alarm probabilities can be attained when the detection SNR is 13 dB in excess of the average Eb/No required to communicate. For fixed transmit power, this implies a minimum integration time corresponding to 20 bits. At the lowest data rate of 1200 bps, this corresponds to 16.67 msec of preamble, whereas at the highest data rate of 76.8 kbps, the preamble duration is about 0.26 msec. It is desirable to prevent mobiles from using excess capacity unnecessarily. Since the status bits are used to indicate acquisition, mobiles cease transmitting if the corresponding status bits indicate they have not been successfully acquired. Therefore, it is desirable to set the minimum preamble time equal to the slot interval and scale the preamble power accordingly for the high data rate channels. In the case of the low data rate reverse packet data channels, the preamble time may easily exceed the slot interval.

The algorithm used by mobiles on the reverse packet data channels to estimate the initial transmit power required in order to be received by the base station at some desired Eb/No plays a critical role in achieving acceptable performance. If the transmit power employed is less than that required to be acquired, the delay experienced by the user is increased. In addition, the overall throughput of the network may be reduced since the resulting energy received at the cell site increases the interference in the system for no gain. If the mobile transmits too much power, other users in the system may experience increased error rates due to the excessive interference, thereby degrading system throughput.

Errors introduced in the open loop estimate can be significant. These errors are due to uncorrelated fading on the forward and reverse links, mobile hardware limitations, and the potential shortcomings of the algorithm used to estimate the initial transmit power. Improvement in the open loop estimation process will have a significant impact on the efficiency of a packet data service.

One possible improvement is to enable mobiles to learn what transmit power is required. That is, some memory of previous attempts must be stored in the mobile. The initial transmit power would be based on the current observation of the forward link and some past history of transmit power. This method would work well for those network applications where mobility is not exercised very often, since mobiles will have derived a reasonable estimate of their effective link path loss.

The current open loop estimate is based on total received power within the allocated bandwidth. It may be possible to improve on this estimate by utilizing information conveyed by both the received pilot Ec/Io and forward packet data channel error rate. That is, the pilot Ec/Io is a better indicator of cell load than total received power and this measure may yield a better open loop estimate. In addition, the average error rate observed on the forward packet data channel coupled with knowledge of the forward power allocation and data rate provide additional information to the mobile. Use of this data may also improve the open loop estimate.

Load Control

Since the packet data service is designed to support multiple data rates, the load presented to the system by a single packet data user is a function of the data rate employed. For example, a single user transmitting at 19.2 kbps is equivalent to two 9600 bps users, for 4800 bps users, etc. Thus, the Erlang variations in the cell load due to packet data traffic can have a significant impact on other traffic types such as voice and circuit switched data. Load control may be exercised by the base station in a dynamic manner to effectively manage the capacity in a fair and intelligent manner. Further, the efficiency of the packet data service can be improved using load management.

In the case of mixed traffic (i.e. voice and data users sharing a common RF channel), the load control algorithm employed may be different than with a pure packet data service. This is becuase the concept of service availability is totally different for voice and data users. The voice user expects a certain fidelity to be maintained over the duration of the call. The data user perceives delay/throughput as the measure of quality In the mixed traffic scenario, it is important to insure that voice traffic call quality is not degraded by the packet data users. The base station must insure that the average load is maintained at a point where statistical variations due to both data and voice users do not significantly increase the frame error rate of voice users. It was shown that instability due to voice activity occurs at fractional cell loads of roughly 75%; depending upon the packet data traffic characterization, network instability may occur at lower fractional cell loads.

For a pure packet data service, load control can be used to improve the efficiency of the network. While the number of receiving elements in the base station ultimately limits the number of simultaneous transactions, the variable data rate nature of the packet service may become the limiting factor in some situations. As an example, suppose the network is designed to achieve a given average load of 20 simultaneous transactions at an average rate of 4800 bps per user. Coverage and availability are generally achieved when the system load does not exceed this. This capacity can be easily exhausted, without incurring blocking due to lack of servers, by enabling a few high data rate transactions. If the average load is allowed to exceed the design, then some users may experience lower availability. Depending upon the statistics of the traffic mix, this may or may not result in acceptable performance.

Load control can be implemented using the busy/idle status flags conveyed on the forward packet data control channel. Several different strategies exist, depending upon the traffic mix, data rates supported, number of receivers and service availability target. Some of these are outlined below:

1. Case of Idle Receivers:
   (a) If the average load is low, the maximum permitted data rate can be increased, and/or additional channels may be enabled.
   (b) If the average load is high, the cell may lower the maximum permitted data rate to achieve the desired load, and/or lower the total number of available channels.
   (c) If the average load is at the desired operating point and idle channels exist, the cell may set the busy flags for all idle channels in order to maximize the throughput of the current users at the expense of blocking accesses. Conversely, the cell may lower the maximum permitted data rate (i.e. reduce the load) and allow more users on. This has the effect of reducing the peak-to-average delay observed by all users for a given number of channels.
2. Case of Busy Receivers:
   (a) If the average load is low, the maximum permitted data rate may be increased.
   (b) If the average load is high, the maximum permitted data rate may be decreased.

Soft Handoff

In a CDMA packet data network, the necessity for soft handoff is questionable since the RLP is designed to efficiently recover from error events. Depending upon the frequency and statistical characterization of error events, soft handoff may improve network efficiency and throughput. The economic and performance tradeoffs associated with providing this capability for packet data traffic are not entirely clear. The cost of providing this capability may be prohibitive for some operators and/or certain mobiles designed specifically for a given application. Nevertheless, we present a proposed scheme which could be adopted if desired.

One of the key problems with soft handoff in a packet data service has to do with synchronizing the forward packet data channel. In circuit switched applications the traffic channels being transmitted by the different cells are synchronized so that the mobile is able to coherently combine the signals prior to detection and decoding. This ability can provide enormous benefits to the network. The fundamental problem in packet data is the outbound message queues in each of the serving cells are not necessarily synchronized, and that requiring this may prove costly. In the event that synchronization is possible, soft handoff on the forward link can be made functionally equivalent to that used on existing traffic channels, although the management functions may be different. If synchronization is not possible, then a form of switched diversity can be used at the mobile to effectively emulate soft handoff.

Mobiles make the determination as to whether they are in handoff. That is, the mobile compares the pilot Ec/Io received from nearby base stations and compares this to the handoff threshold. If the threshold is exceeded, the mobile issues a request to the serving base station to be placed into soft handoff is desired. The serving base station arranges this with the switch and then places the mobile into soft handoff given that the request is granted. At this point the mobile knows which forward packet data channels to demodulate.

On the reverse link, common code channels shared by adjacent cells can be defined to accommodate soft handoff. This way, the base station does not require explicit knowledge of the handoff status of mobiles in order to demodulate them.

The switch has knowledge of the soft handoff status of all mobiles in the network. When messages addressed to a specific mobile arrive at the switch, they are forwarded to the appropriate base stations for transmission. Messages received at the base station from mobiles in soft handoff are forwarded to the switch in the same manner they are for mobiles not in handoff. The RLP running at the switch is responsible for removal of duplicate frames received from serving base stations as well as issuing retransmission requests to the serving base stations. The RLP residing at the mobile performs a similar function.

Control channel information (i.e. status and power control) is derived independently at each base station and is transmitted to the mobiles in the same way as is done for mobiles not in handoff. That is, no coordination is required on the part of the base station for transmission of control information to mobiles in soft handoff. The mobile must be capable of demodulating up to three control subchannels independently as is currently done for power control bits. The rules governing interpretation of the power control bits remain the same, i.e., the mobile decreases it's transmit power if any cell requests this. The decision as to whether the channel is available is made on a similar basis. That is, the channel is assumed to be busy if any cell indicates a busy status. Further, acquisition is assumed if any cell indicates this by setting the appropriate status bits busy. The power control bits should indicate power up in the channel idle status to prevent disabling of acquired mobiles in handoff with adjacent cells.

If the forward packet data channels are transmitted synchronously, mobiles perform demodulation and diversity combining for soft handoff per IS-95. If the forward link packet data channels cannot be made synchronous, mobiles are required to demodulate only one of the forward packet data channels at any given interval. The selected is performed based on pilot strength. Switching between forward packet data channels is limited to the minimum slot interval in the system, and may be disabled during reception of a message. Note that the interleaving and mobile receiver processing delay increase the possibility of switching during message reception. In order to accommodate the switched diversity operation in the mobile, it may be desirable to reserve staggered slot intervals on the forward packet data channels used by the serving base stations. In this way, mobiles may alternate between channels without necessarily incurring data losses.

What has been shown and decided herein are methodologies for improving CDMA packet data service. The scheme employs closed loop power control for reverse link traffic and does not involve traffic channel set-up. In addition, the scheme supports multiple data rates and allows for a multitude of channel structures to be defined, depending upon the network traffic requirements. Further, in order to maximize the channel throughput, the scheme takes advantage of load fluctuations within the network, thereby allowing higher data rates to be accommodated in an adaptive manner. Finally, the concepts of soft handoff are extended to provide the packet data users with additional macro diversity which serves to increase network efficiency.

What is claimed is:

1. A method of communicating forward packet data and forward packet data control information over a forward link in a packet-switched CDMA network, comprising the steps of:

carrying the packet data on the in-phase component of a quadrature-carrier signal; and carrying the packet data control information on the quadrature component of said quadrature-carrier signal.

\* \* \* \* \*